(12) United States Patent
Shinogi et al.

(10) Patent No.: US 7,987,042 B2
(45) Date of Patent: Jul. 26, 2011

(54) ENGINE OIL LEVEL DETECTION SYSTEM

(75) Inventors: Yoshihisa Shinogi, Wako (JP); Tomoki Fukushima, Wako (JP); Naoya Toida, Wako (JP); Akihisa Shinoda, Wako (JP); Takeshi Maeda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 588 days.

(21) Appl. No.: 11/993,487

(22) PCT Filed: Jun. 16, 2006

(86) PCT No.: PCT/JP2006/312565
§ 371 (c)(1),
(2), (4) Date: Sep. 19, 2008

(87) PCT Pub. No.: WO2006/137507
PCT Pub. Date: Dec. 28, 2006

(65) Prior Publication Data
US 2010/0042310 A1 Feb. 18, 2010

(30) Foreign Application Priority Data

Jun. 23, 2005 (JP) ................... 2005-182840
Jun. 23, 2005 (JP) ................... 2005-182872

(51) Int. Cl.
*G06F 19/00* (2011.01)
*F01M 1/02* (2006.01)
*G01F 23/30* (2006.01)

(52) U.S. Cl. ........... 701/112; 123/195 S; 73/305

(58) Field of Classification Search .......... 701/101, 701/102, 104, 112, 114, 115; 123/196 R, 123/196 M, 196 S, 196 CP, 198 D, 198 DB, 123/198 F, 674; 73/305, 308, 311, 313, 317
See application file for complete search history.

(56) References Cited

U.S. PATENT DOCUMENTS

| 4,094,293 A * | 6/1978 | Evans ................ 123/196 S |
| 4,848,151 A | 7/1989 | Bruder et al. |

(Continued)

FOREIGN PATENT DOCUMENTS

JP  55-45733 B2  11/1980

(Continued)

OTHER PUBLICATIONS

International Search Report of PCT/JP2006/312565, date of Mailing Dec. 1, 2006.

*Primary Examiner* — Willis Wolfe, Jr.
*Assistant Examiner* — Johnny Hoang
(74) *Attorney, Agent, or Firm* — Westerman, Hattori, Daniels & Adrian, LLP

(57) ABSTRACT

An oil level detection apparatus having a float-type oil level detector (50) and a mode switching unit. The oil level detector emits a signal indicating that the oil level has dropped when a movable contact disposed on a float (54) makes contact with fixed contacts once the level of oil (Lu) has dropped to a lower limit level. The mode switching unit switches between one of two modes selected from a first mode for actuating the alarm and stopping the engine (10) in accordance with the level drop signal, and a second mode for actuating the alarm and continuing to operate the engine (10) in accordance with the level drop signal.

6 Claims, 11 Drawing Sheets

U.S. PATENT DOCUMENTS

| | | | |
|---|---|---|---|
| 5,014,820 A * | 5/1991 | Evans | 184/6.3 |
| 5,069,154 A * | 12/1991 | Carter | 114/211 |
| 5,201,186 A * | 4/1993 | Hanson | 62/126 |
| 5,305,639 A * | 4/1994 | Pontefract | 73/317 |
| 5,347,864 A * | 9/1994 | Senghaas et al. | 73/313 |
| 5,493,086 A | 2/1996 | Murphy, Jr. et al. | |
| 6,040,767 A | 3/2000 | Dykstra | |
| 6,161,515 A * | 12/2000 | Kopec | 123/196 R |
| 6,254,351 B1 | 7/2001 | Culp | |
| 7,806,099 B2 * | 10/2010 | Nielsen | 123/196 R |

FOREIGN PATENT DOCUMENTS

| | | |
|---|---|---|
| JP | 57-212312 A | 12/1982 |
| JP | 58-163826 U | 10/1983 |
| JP | 60-331 A | 1/1985 |
| JP | 2532891 Y2 | 4/1997 |

* cited by examiner

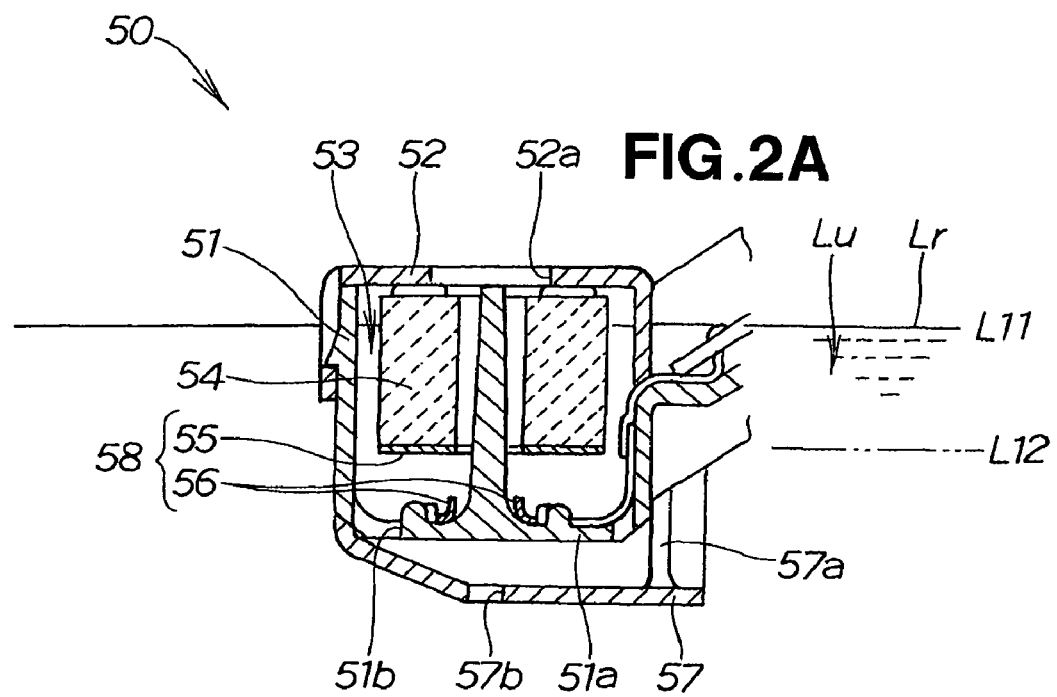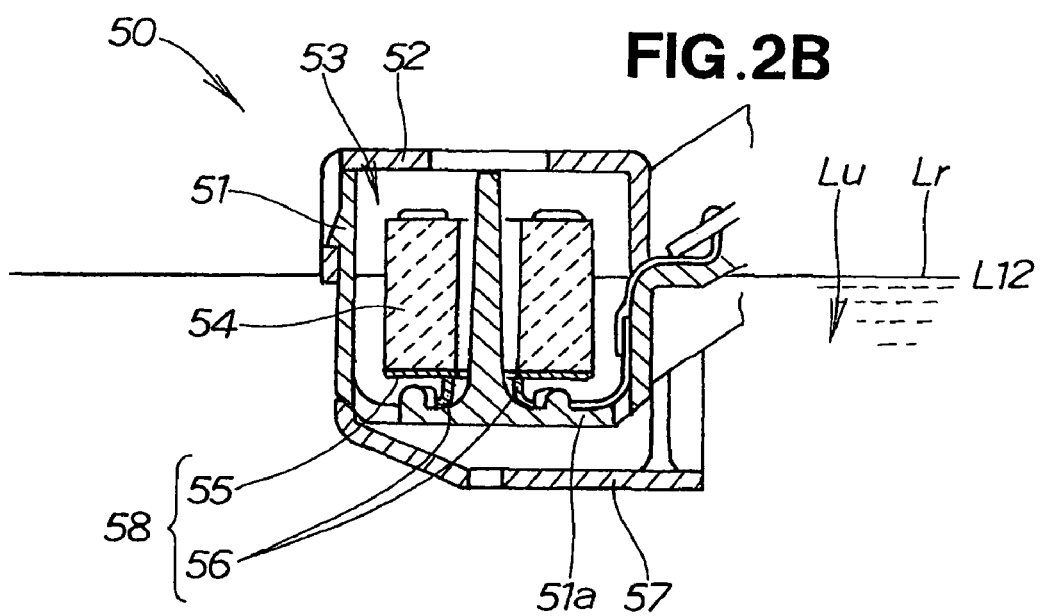

ENGINE OIL LEVEL DETECTION SYSTEM

TECHNICAL FIELD

The present invention relates to an apparatus for detecting the oil level in the crankcase of an engine and to a method of the same.

BACKGROUND ART

The lubrication structure of an engine is configured so that the sliding parts of the engine are lubricated by oil in the crankcase. Various types of oil level detection apparatuses for detecting the level of oil pooled in the crankcase have been disclosed, such as those in Japanese Laid-Open Utility Model Application No. 58-163826, Japanese Laid-Open Patent Application (Kokai) No. 60-331, and Japanese Patent Publication (Kokoku) No. 55-45733.

The oil level detection apparatuses known in Japanese Laid-open Utility Model Application No. 58-163826, Japanese Laid-open Patent Application (Kokai) No. 60-331, and Japanese Patent Publication (Kokoku) No. 55-45733 are provided with a magnetic float switch. The magnetic float switch comprises a float, a permanent magnet housed in the float, and a reed switch for sensing the magnetic force of the permanent magnet. In accordance with these oil level detection apparatuses, a drop in the level of the oil to a preset lower limit level causes the float to move down in accordance with this drop, and the reed switch therefore senses the magnetic force of the permanent magnet housing in the float, whereby the level drop is detected, an indicator lights is lighted, and an alarm is issued.

However, in the oil level detection apparatuses known in Japanese Laid-Open Utility Model Application No. 58-163826, Japanese Laid-Open Patent Application (Kokai) No. 60-331, and Japanese Patent Publication (Kokoku) No. 55-45733, consideration must be given to prevent the reed switch from being affected by an external magnetic field.

In view of the above, efforts are being made to develop an oil level detection apparatus for an engine in which the float switch does not use a reed switch. Such an oil level detection apparatus is proposed in Japanese Utility Model Registration No. 2532891. A summary of the oil level detection apparatus disclosed in Japanese Utility Model Registration No. 2532891 is described with reference to FIGS. 11A and 11B.

FIG. 11A shows an engine provided with an oil level detection apparatus, and FIG. 11B shows a schematic diagram of the oil level detection apparatus shown in FIG. 11A.

The engine 100 shown in FIG. 11A is a general-purpose engine in which oil 102 is pooled in the bottom of the crankcase 101. The engine 100 is provided with an oil dipper 104 for lifting and supplying oil 102 to sliding parts in accompaniment with the rotation of the crank shaft 103, and a float-type oil level detector 111 for detecting the level of oil 102 in the crankcase 101.

The levels of the oil 102 are each set in that the upper limit level L1 is set at the highest point, the lower limit level L2 is set below the upper limit level L1, and the lowest limit level L3 is set below the lower limit level L2. FIG. 11B shows the oil level detection apparatus 110 when the oil 102 has risen to the upper limit level L1.

The oil level detection apparatus 110 either merely provides notification in accordance with the levels L1 to L3 detected by the float-type oil level detector 111, or provides notification and stops the engine 100, as shown in FIGS. 11A and 11B. More specifically, the float-type oil level detector 111 has a float 113 in a casing 112, and an electroconductive vertical rod 114 that is fixed to the float 113. Following is a description of the effects of the oil level detection apparatus 110.

With the engine 100 operating, a drop in the oil 102 to the lower limit level L2 causes the vertical rod 114 to descend together with the float 113 and to make contact with the bottom surface 101a of the crankcase 101. As a result, the path through the battery 115, the alarm lamp 116, the electroconductive ring 112a of the casing 112, the vertical rod 114, and the bottom surface 101a of the crankcase 101 is made electrically conductive. As a result, the alarm lamp 116 is lighted and notification is provided that the oil level is at the lower limit level L2.

Furthermore, when the oil 102 has dropped to the lowest limit level L3, the movable contact 117 disposed on the lower surface of the float 113 makes contact with the fixed contacts 118 and 118. As a result, the engine 100 stops because the ignition apparatus 119 stops ignition operation.

Following is the case in which the engine 100 is mounted in a work machine. The term "work machine" includes stationary and mobile (portable) equipment.

Electric generators, high-pressure washers, and other stationary work machines do not move, and the work machine itself does not significantly shake. The engine 100 mounted in a stationary work machine also does not significantly shake. For this reason, the level of the oil 102 does not vary considerably. Therefore, when the level of the oil drops to a fixed level or lower, the engine 100 automatically stops.

Cultivators or other mobile work machines shake considerably during movement. The engine 100 mounted in a mobile work machine also shakes considerably. For this reason, the level of the oil 102 shakes considerably in comparison with an engine mounted in a stationary work machine. Also, since the oil 102 is lifted by the oil dipper 104, the fluctuation in the oil level is considerable.

When the float 113 vertically moves in accordance with the fluctuations in the oil level, the movable contact 117 also moves. When the movable contact 117 moves considerably in the vertical direction with the oil 102 in a dropped state, the level is detected as having dropped even though the actual level (current level) has not dropped to the lowest limit level L3. As a result, the engine 100 stops. Because of this situation, the engine 100 cannot automatically stop even if the level of the oil has dropped to a fixed level or lower in the case that the engine 100 is mounted in a mobile work machine.

A type of oil level detection apparatus 100 that can automatically stop the engine 100 must therefore be provided when the engine 100 is mounted in a stationary work machine. Also, a type of oil level detection apparatus 100 in which the engine 100 is not automatically stopped must be provided when the engine 100 is mounted in a mobile work machine. Under such conditions, two types of oil level detection-apparatuses 110 for an engine must be provided in accordance with the type of implement such a work machine, more time is needed to manage the machine, and the manufacturing cost increases. Therefore, there is room for improvement.

In view of the above, there is a need for an art that can be used both when the engine is automatically stopped and when the engine is not automatically stopped once the level of the oil in the crankcase has dropped to a fixed level or lower, by using only one type of oil level detection apparatus.

Furthermore, the level of the oil 102 shakes due to the vibrations of the engine 100 when the engine 100 is operating, as shown in FIGS. 11A and 11B. Also, since the oil 102 is lifted by the oil dipper 104, waves are generated on the surface of the oil. In other words, the fluctuations of the oil level are considerable. The vertical rod 114 and movable contact 117

(hereinafter the two are referred to as "movable contact 117") also move vertically in accompaniment with the vertical movement of the float 113 in accordance with the fluctuations in the oil level.

The movable contact 117 is a switch member that is directly mounted on the float 113 and does not have hysteretic switch operation characteristics such as those of a magnetic float switch. For this reason, if the actual level decreases to the vicinity of the lowest limit level L3 when the oil level has dropped while considerably moving up and down, the movable contact 117 makes intermittent contact with the fixed contacts 118 and 118. In other words, the movable contact 117 can make intermittent contact with the fixed contacts 118 and 118 in spite of the fact that the actual level has not dropped to the lowest limit level L3. Also, when the actual level has dropped to the lowest limit level L3, the movable contact 117 intermittently repeats very short contact with the fixed contacts 118 and 118.

When the engine 100 is stopped, the oil level does not change. The movable contact 117 remains in continuous contact with the fixed contacts 118 and 118 when the oil has dropped to the lowest limit level L3.

The level detection operation by the movable contact 117 and the pair of fixed contacts 118 and 118 is completely different depending on whether the engine 100 is stopped or operating. Due to this fact, consideration must be given for more accurate and reliable detection regardless of the engine operating state.

In view of the above, there is a need for an art that can allow the oil level of an engine to be more accurately and reliably detected when the engine is stopped or operating.

DISCLOSURE OF THE INVENTION

The present invention provides an oil level detection apparatus used in an engine in which an oil dipper lifts oil in the crankcase and performs lubrication in accompaniment with the rotation of a crankshaft, the apparatus comprising an oil level detector for emitting a signal indicating that the oil level has dropped when a movable contact disposed on a float that moves vertically in accordance with the level of the oil makes contact with fixed contacts once the level of the oil has dropped to a preset lower limit level; and mode switching units for selecting one of two modes selected from a first mode for actuating an alarm in accordance with the level drop signal and bringing the engine to a stop, and a second mode for actuating the alarm in accordance with the level drop signal and allowing the engine to continue to operate.

Thus, in the above-described oil level detection apparatus, the control modes for controlling the alarm and the engine can be switched by the mode switching unit to a mode selected from the first mode and the second mode. When the unit has switched to the first mode, the alarm can be actuated and the engine can be stopped in accordance with the level drop signal. Also, when the unit has switched to the second mode, the alarm can be actuated and the engine can continue to be operated in accordance with the level drop signal.

Therefore, a single type of oil level detection apparatus can be used both in cases in which the engine is automatically stopped when the level of the oil in the crankcase has dropped to a fixed level or lower, and in cases in which the engine is not automatically stopped when the level of the oil in the crankcase has dropped to a fixed level or lower. Thus, only one type of oil level detection apparatus needs to be provided, less time is needed to manage the oil level detection apparatus of the engine, and manufacturing costs can be reduced. Moreover, any type of implement (e.g., machines capable of performing various tasks, or the like) can be handled with one type of oil level detection apparatus.

The mode switching unit preferably has a manual operating switch that can be mounted on an operating panel of the engine. For this reason, the operator can simply switch to the first or second mode by simply operating the manual operating switch.

The mode switching unit preferably has a switching actuator and a memory provided to the engine, the memory is configured so that mode switching data can be written in accordance with communication from an external communication unit, and the switching actuator can be switched between one of two modes selected from the first mode and the second mode on the basis of the mode switching data stored in the memory. Therefore, the mode switching unit automatically switches to the first or second mode on the basis of the mode switching data by writing the mode switching data to the memory provided to the engine, with the aid of the external communication unit. Thus, the user is not required to switch to either the first mode or second mode.

The oil level detection apparatus described above preferably further has a first determination unit and a second determination unit for determining that the level of the oil has actually dropped, characterized in that the first determination unit determines that the actual level of the oil has dropped to the lower limit level when two conditions have been satisfied, i.e., the condition that the engine is stopped, and the condition that the duration of the level drop signal has reached a preset reference time; and the second determination unit determines that the actual level of the oil has dropped to the lower limit level when two conditions have been satisfied, i.e., the condition that the engine is operating, and the condition that the number of times the level drop signal has been received has reached a preset reference number of times.

Thus, the first determination unit determines that the actual level has dropped when the engine is stopped and the level drop signal (i.e., the state in which the movable point is in contact with the fixed contacts) continues over a fixed length of time. The first determination unit is optimal for determining an actual level drop when the engine is stopped. The second determination unit determines that the actual level has dropped when the engine is operating and the level drop signal continues over a fixed length of time. The second determination unit is optimal for determining an actual level drop during engine operation. Therefore, the oil level of an engine can be more accurately and reliably detected when the engine is stopped and when it is operating by merely using a simple configuration in which two determination units are provided to the oil level detection apparatus.

The second determination unit is preferably provided with a reset unit for resetting the number of times the level drop signal has been received when the condition is satisfied that the next level drop signal has not been received by the time a preset fixed time has elapsed after having received the previous level drop signal. In this case, the previous and next level drop signals reflect the relative order of the level drop signals that are intermittently received. For this reason, when the second determination unit is detecting the level while the engine is operating, the unit determines that the level drop signal is not a level drop signal that accompanies the ordinary rise and fall of the oil surface (e.g., temporary noise) when the interval of time between the level drop signals is considerable, and the number of times the level drop signal is received can be reset. Thus, the level of the oil during engine operation can be more accurately and reliably detected by resetting the signal.

The present invention further provides a method for detecting the level of oil in the crankcase of an engine, the method having a step for detecting the level of the oil by using an oil level detector having a float, a movable contact, and fixed contacts; a step in which the float-type oil level detector issues a level drop signal when the level of the oil has dropped to a preset lower limit level; a step for determining that the actual level of the oil has dropped to the lower limit level when a first determination criterion comprising two conditions has been satisfied, i.e., the condition that the engine is stopped, and the condition that the duration of the level drop signal has reached a preset reference time; and a step for determining that the actual level of the oil has dropped to the lower limit level when a second determination criterion comprising two conditions has been satisfied, i.e., the condition that the engine is operating, and the condition that the number of times the level drop signal has been received has reached a preset reference number of times.

In this manner, the oil level detection method of the present invention focuses on the fact that since the state of the surface of the oil is generally different during engine operation and when the engine is stopped, the behavior of the float is also different is accordance therewith. In other words, the surface of the oil does not vary when the engine is stopped, and the surface of oil experiences considerable vertical movement when the engine is operating.

For this reason, in the engine oil level detection method of the second aspect of the present invention, there are two criteria, i.e., a first determination criterion and a second determination criterion for determining an actual drop in the oil level.

The first determination criterion determines that the actual level has dropped when the engine is stopped and the level drop signal (i.e., the state in which the movable point is in contact with the fixed contacts) continues over a fixed length of time. The first determination criterion is optimal for determining an actual level drop when the engine is stopped. Conversely, the second determination criterion determines that the actual level has dropped when the engine is operating and the level drop signal continues over a fixed length of time. The second determination criterion is optimal for determining an actual level drop during engine operation. Therefore, the oil level of an engine can be more accurately and reliably detected when the engine is stopped and when it is operating by using a simple method in which two determination criteria are established in the oil level detection method.

BRIEF DESCRIPTION OF THE DRAWINGS

Certain preferred embodiments of the present invention will be described in detail below, by way of example only, with reference to the accompanying drawings, in which:

FIGS. 2A and 2B are detailed cross-sectional views of the oil level detector shown in FIG. 1;

BEST MODE FOR CARRYING OUT THE INVENTION

Figure 1:
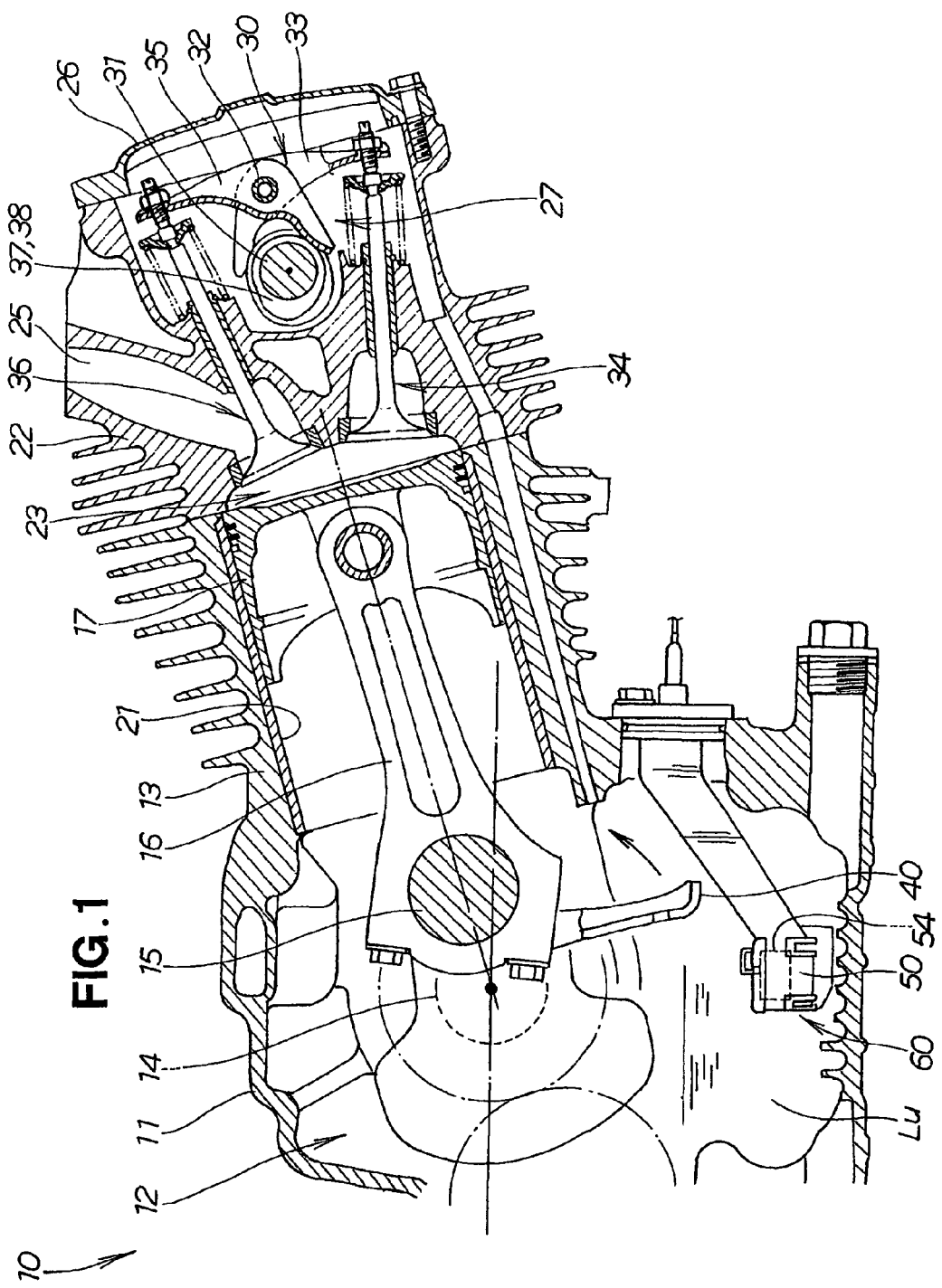
FIG. 1 is a cross-sectional view of the engine main body provided with the float-type oil level detector of the present invention.

The engine unit 10 shown in FIG. 1 is an example of an OHC-type air-cooled single-cylinder internal combustion engine in which the cylinder 21 is slanted in relation to a substantially horizontal crank shaft 14.

The engine 10 is described in detail below.

The crankcase 11 of the engine 10 is configured by integrally forming a crank chamber 12 and a cylinder block 13. The crank chamber 12 rotatably accommodates and supports the crank shaft 14. The crank shaft 14 is linked to a connecting rod 16 on a crank pin 15 in the crank chamber 12, and a piston 17 is linked to the connecting rod 16.

The cylinder block 13 is configured with a cylinder 21 formed therein, a cylinder head 22 is bolted to the distal end portion, a combustion chamber 23 is formed between the distal end portion of the cylinder 21 and the cylinder head 22, and an air intake port (not shown) and an exhaust port 25 are formed in the cylinder head 22. The piston 17 reciprocatingly moves within the cylinder 21.

A valve movement chamber 27 is formed by enclosing the distal end portion of the cylinder head 22 with a head cover 26. A valve movement mechanism 30 is disposed in the valve movement chamber 27. The valve movement mechanism 30 is mainly composed of a single cam shaft 31, a rocker arm 32, an air intake valve rocker arm 33, an air intake valve 34, an exhaust valve rocker arm 35, and an exhaust valve 36, and is mounted on the cylinder head 22.

The cam shaft 31 is rotatably supported by the cylinder head 22, is configured to be driven by the crank shaft 14 by way of a power transmission mechanism (not shown), and is provided with an air intake valve drive cam 37 and an exhaust valve drive cam 38. The air intake valve drive cam 37 and exhaust valve drive cam 38 are displaced in accompaniment with the rotation of the cam shaft 31, causing the air intake valve rocker arm 33 and exhaust valve rocker arm 35 to swing. As a result, the air intake valve 34 and exhaust valve 36 open and close with a prescribed open/close timing.

The engine 10 is provided with an oil dipper 40 for lifting oil Lu in accompaniment with the rotation of the crank shaft 14 and supplying the oil to the sliding parts, and a float-type oil level detector (oil alert) 50 for detecting the level of the oil Lu.

More specifically, the connecting rod 16 is provided with an oil dipper 40 for lifting the oil Lu in the bottom (oil pan) of the crank chamber 12. By rotating, the oil dipper 40 can lift the oil Lu pooled in the bottom of the crank chamber 12 and disperse the oil in the crank chamber 12 and cylinder 21. The dispersed oil Lu can enter and lubricate the sliding parts of each member in the crank chamber 12 and cylinder 21.

FIG. 2A shows the oil level detector 50 in the state in which oil Lu is sufficiently pooled to an upper limit level L11. FIG.

2B shows an oil level detector 50 in the state in which the oil Lu has dropped to a lower limit level L12.

The oil level detector 50 is a sensor that is configured to issue a level drop detection signal (i.e., level drop signal) when the movable contact 55 disposed in the float 54 makes contact with a pair of fixed contacts 56 and 56 when the actual level Lr (height Lr of the oil surface) of the oil Lu has dropped to a preset lower limit level L12, as shown in FIG. 2A.

More specifically, the oil level detector 50 is composed of a case main body 51, a lid 52 that covers the upper end opening of the case main body 51, a float chamber 53 formed by being enclosed in the case main body 51 and lid 52, a float 54 that is elevatably accommodated in the float chamber 53, a movable contact 55 disposed on the bottom surface of the float 54, and a pair of fixed contacts 56 and 56 disposed on the bottom plate 51*a* of the case main body 51 so as to face the movable contact 55.

The bottom plate 51*a* has a through-hole 51*b*, and the lid 52 has a through-hole 52*a*. The through-holes 51*b* and 52*a* allow oil Lu to pass in and out of the float chamber 53. A cover 57 covers the bottom plate 51*a* with a fixed gap [therebetween]. The cover 57 has a rear opening 57*a* and a lower through-hole 57*b* through which oil Lu passes. The rear opening 57*a* is laterally open to the side opposite from the direction of rotation of the oil dipper 40 (see FIG. 1). For this reason, the effects of the fluctuations in the oil surface caused by the lifting of oil Lu by the oil dipper 40 can be inhibited to the extent possible.

The float 54 is an electrically insulated and substantially doughnut-shaped float that floats on the oil surface and rises and falls in accordance with the oil surface. The movable contact 55 is a flat, horizontal, electroconductive disc. The pair of fixed contacts 56 and 56 are electroconductive members that stand erect from the bottom plate 51*a*. An oil level switch 58 is a combination of the movable contact 55 and the fixed contacts 56 and 56.

The effects of the oil level detector 50 are described next.

In a state in which the oil Lu is sufficiently pooled to the upper limit level L11, as shown in FIG. 2A, the float 54 floats on the surface of the oil. In this state, the movable contact 55 is separated from the pair of the fixed contacts 56 and 56. As a result, the oil level switch 58 is OFF.

In a state in which the surface of the oil Lu has thereafter dropped to the lower limit level L12, as shown in FIG. 2B, the float 54 drops to the lowest portion of the float chamber 53. In this state, the movable contact 55 is in contact with the pair of fixed contacts 56 and 56. As a result, the oil level switch 58 is switched on, and a level drop signal (switch-on signal) is issued.

Figure 3:
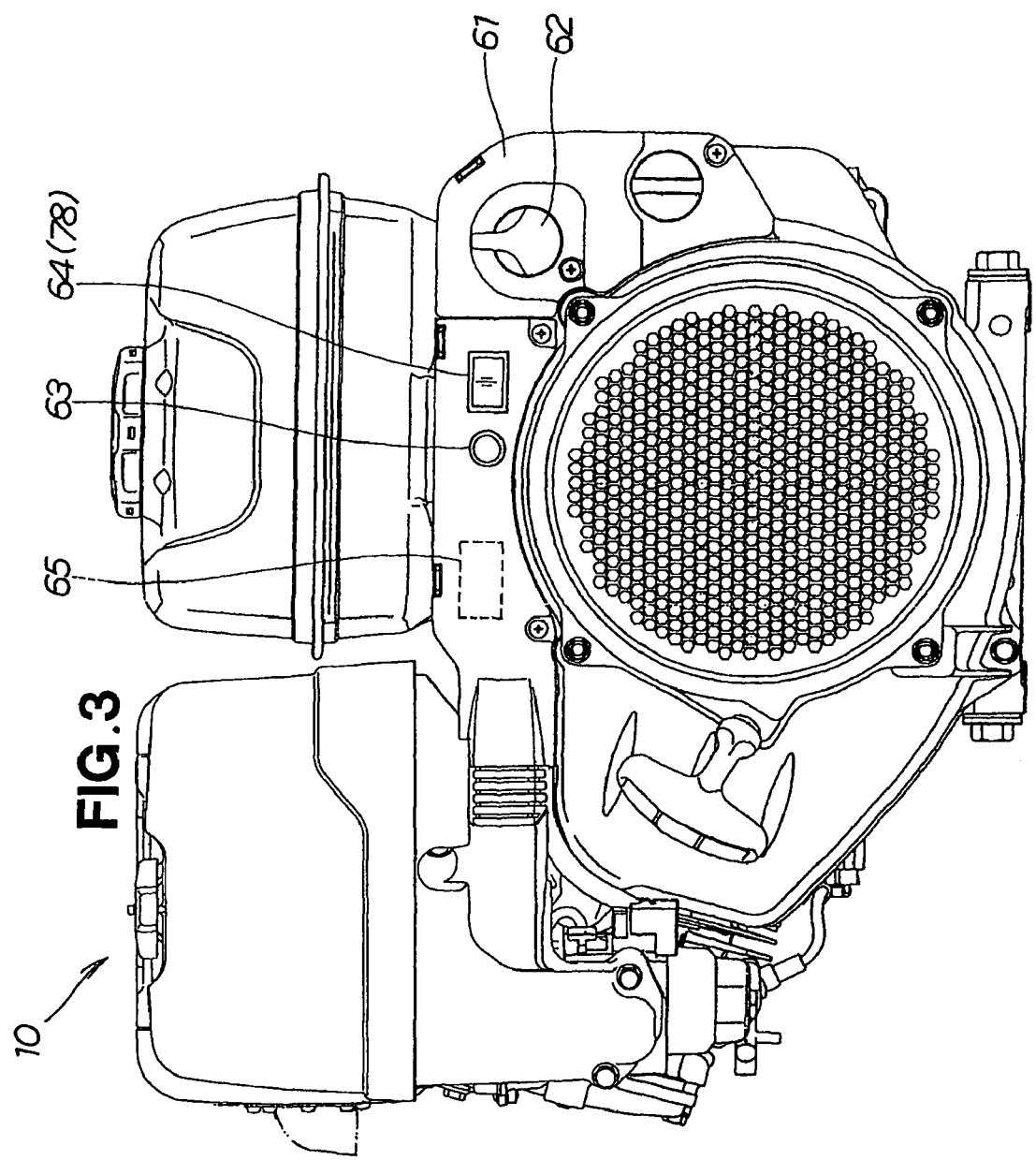
FIG. 3 is rear view of a general-purpose engine.

The engine 10 is provided with a main switch 62, an alarm 63, and a changeover switch 64 on the operating panel 61 that is disposed on the rear surface, as shown in FIG. 3.

The main switch 62 is a manually operated switch for starting and stopping the engine 10 by rotating the knob. The alarm 63 is composed of a display lamp or another indicator, and a buzzer or another warning sound alarm. The changeover switch 64 is a manually operable sliding switch, a push-button switch, or another manually operated switch. The engine 10 is provided with a controller 65 on the operating panel 61 or in any position, as shown in FIG. 3.

An oil level detection apparatus 60 for an engine in which the oil level detector 50 is used is described below with reference to FIG. 4.

Figure 4:
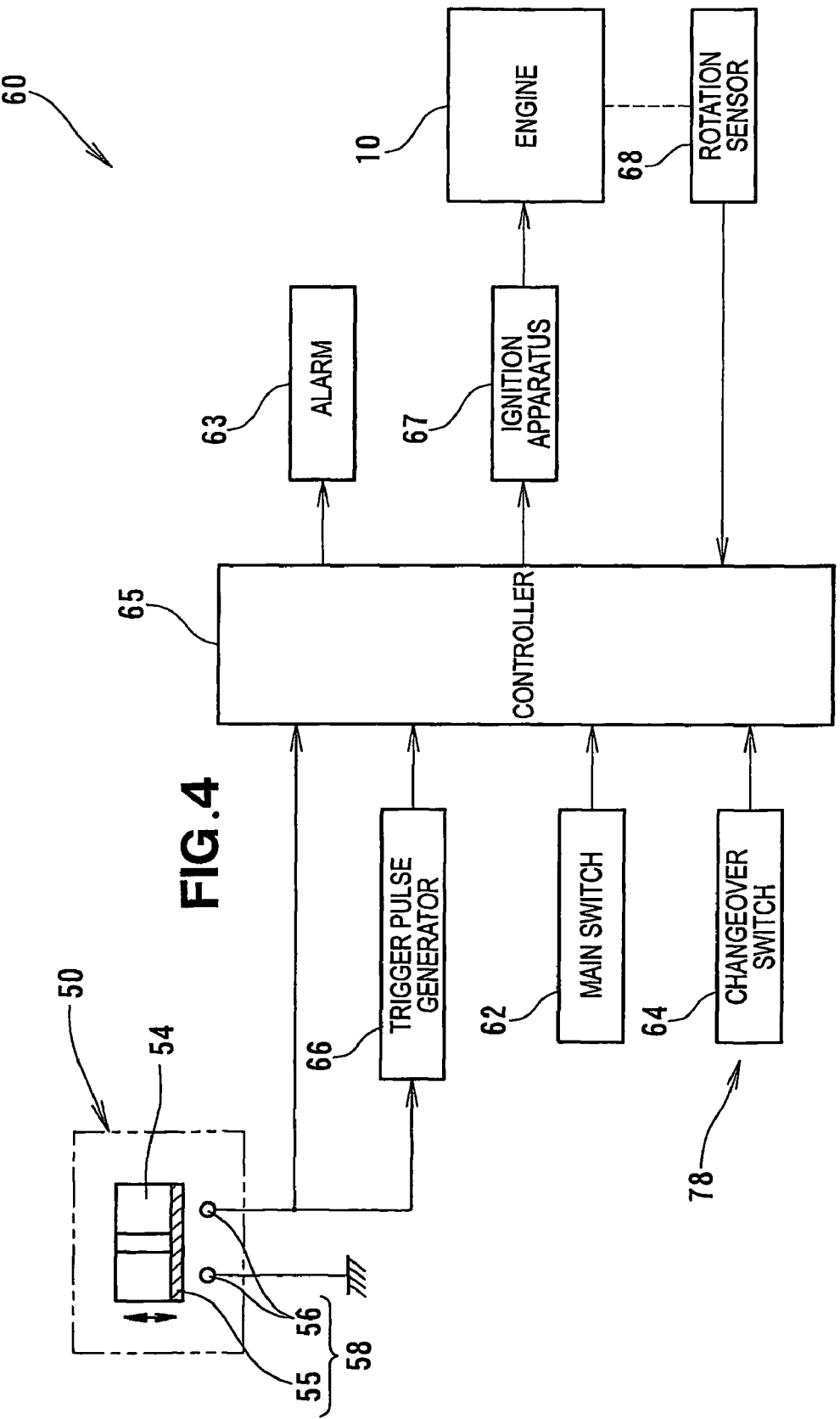
FIG. 4 is an electrical block diagram of the oil level detection apparatus of the present invention.

The oil level detection apparatus 60 for an engine has a float-type oil level detector 50, a main switch 62, an alarm 63, a changeover switch 64, a controller 65, a trigger pulse generator 66, an ignition apparatus 67 for the engine 10, and a rotation sensor 68, as shown in FIG. 4.

The controller 65 receives signals from the oil level detector 50, main switch 62, changeover switch 64, trigger pulse generator 66, and rotation sensor 68, and issues control signals to the alarm 63 and ignition apparatus 67.

The trigger pulse generator 66 issues trigger pulse signals on the basis of the detection signals of the float-type oil level detector 50. The trigger pulse generator 66 is composed, for example, of a single stable multivibrator or other device that issues a single pulse signal each time an ON signal is received from the oil level switch 58; i.e., each time the oil level switch 58 is reversed from OFF to ON.

The ignition apparatus 67 sends high-voltage electricity to the spark plug (not shown) of the engine 10. The rotation sensor 68 detects the rotational speed of the engine 10.

The control flow is described next with reference to FIGS. 5 and 6 for a case in which a microcomputer is used as the controller 65 shown in FIG. 4. The control flow initiates control when, for example, the main switch 62 is switched on, and the control routine is ended when the main switch 62 is switched off. The controller 65 houses the first timer 71 shown in FIG. 5, and the counter 72 and second timer 73 shown in FIG. 6. Following is a description based on FIGS. 5 and 6 with reference to FIGS. 2 and 4.

Step (hereinafter abbreviated as ST) 01: The settings are initialized. More specifically, the count time Tc1 of the first timer 71 is set to 0, the pulse count number Cu of the counter 72 is set to 0, and the count time Tc2 of the second timer 73 is set to 0.

ST02: Signals from the float-type oil level detector 50, main switch 62, changeover switch 64, trigger pulse generator 66, and rotation sensor 68 are read.

ST03: It is determined whether the engine 10 is stopped. If YES, the process goes to ST04. If NO, the engine 10 is determined to be operating, and the process goes to ST21 of FIG. 6. ST21 is described hereinbelow. In ST03, the engine 10 is determined to be stopped when, for example, the rotational speed of the engine 10 detected by the rotation sensor 68 falls below a preset reference rotational speed (low rotational speed in a nearly stopped state).

ST04: It is determined whether the oil level switch 58 is on. If YES, the process goes to ST05. If NO, the process goes to ST10. ST10 is described hereinbelow.

ST05: It is determined whether the count time Tc1 of the first timer 71 is equal to 0. If YES, the first timer 71 is determined to be stopped, and the process goes to ST06. If NO, the count is determined to be ongoing, and the process goes to ST07.

ST06: The first timer 71 is started.

ST07: It is determined whether the count time Tc1 (i.e., elapsed time Tc1) has exceeded a preset first reference time Ts1. If YES, the process goes to ST08. If NO, return to ST02. A determination of YES is made when the duration Tc1 of the on-state of the oil level switch 58 has satisfied the condition that the first reference time Ts1 has elapsed.

ST08: The first timer 71 is started.

ST09: Alarm 63 is actuated, and control by the controller 65 is then ended. The alarm 63 provides notification that the actual level Lr of the oil Lu has dropped to the lower limit level L12, as shown in FIG. 2B.

ST10: The first timer 71 is stopped or kept in the stopped state.

ST11: The count time Tc1 to 0 is reset and the process returns to ST02.

Figure 6:
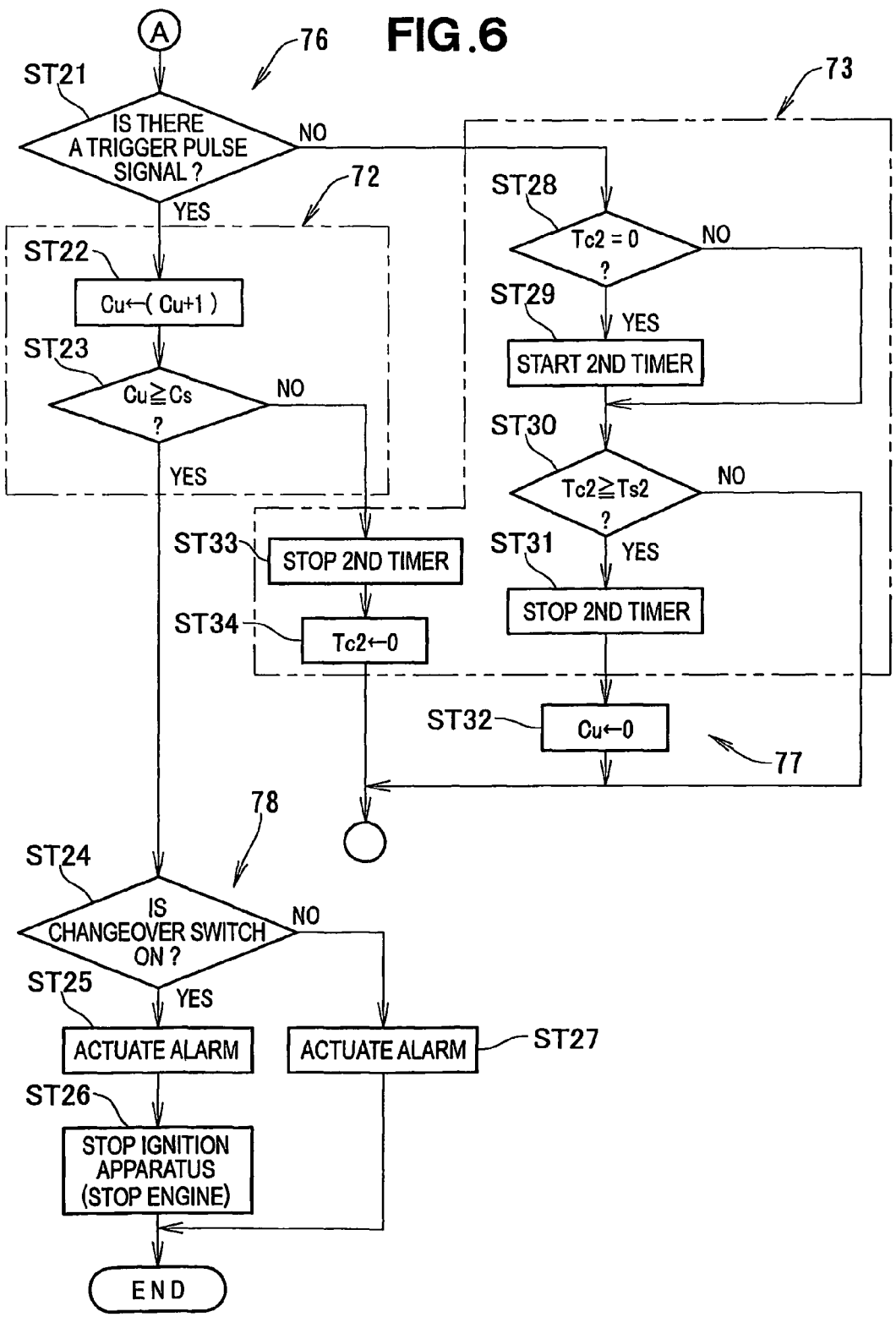

The flowchart shown in FIG. 6 is described next.

ST21: Since engine 10 is operating, it is determined whether there has been a trigger pulse signal from the trigger pulse generator 66. If YES, the process goes to ST22. If NO, the process goes to ST28. ST28 is described hereinbelow.

ST22: Since there was a trigger pulse signal, one pulse count Cu is added (the number of trigger pulse signals is counted).

ST23: It is determined whether the pulse count Cu has reached a preset reference pulse count Cs. If YES, the process goes to ST24. If NO, the process goes to ST33. ST33 is described hereinbelow.

ST24: It is determined whether the changeover switch 64 is on. If YES, it is determined that the first mode has been selected, and the process goes to ST25. If NO, it is determined that the second mode has been selected, and the process goes to ST27.

ST25: Alarm 63 is actuated. The alarm 63 provides notification that the actual level Lr of the oil Lu has dropped to the lower limit level L12, as shown in FIG. 2B.

ST26: The ignition apparatus 67 is stopped, and control by the controller 65 is then ended. As a result, the engine 10 will stop because high-voltage electricity is not applied from the ignition apparatus 67 to the spark plug (not shown).

ST27: Alarm 63 is actuated, and control by the controller 65 is then ended. The alarm 63 provides notification that the actual level Lr of the oil Lu has dropped to the lower limit level L12, as shown in FIG. 2B.

ST28: Since a trigger pulse signal has not been received, it is determined whether the count time Tc2 of the second timer 73 is 0. If YES, it is determined that the second timer 73 has been stopped, and the process goes to ST29. If NO, it is determined that the count is ongoing, and the process goes to ST30.

ST29: The second timer 73 is started.

ST30: It is determined whether the count time Tc2 (i.e., elapsed time Tc2) has exceeded a preset second reference time Ts2. If YES, the process goes to ST31. If NO, the process returns to ST02 of FIG. 5. A determination of YES is made when the time Tc2 (i.e., the interval of time Tc2 in which a trigger pulse signal is received) has satisfied the condition that the second reference time Ts2 has elapsed. Tc2 is the time that begins when the trigger pulse generator 66 issues the previous trigger pulse signal and ends when the subsequent trigger pulse signal is issued. In this case, the previous and next trigger pulse signals reflect the relative order of the trigger pulse signals intermittently issued by the trigger pulse generator 66.

ST31: The second timer 73 is stopped.

ST32: The pulse count Cu is reset to 0, and the process then returns to ST02.

ST33: The second timer 73 is stopped or kept in the stopped state.

ST34: The count time Tc2 is reset to 0, and the process then returns to ST02.

Following is a summary of the above description.

Figure 5:
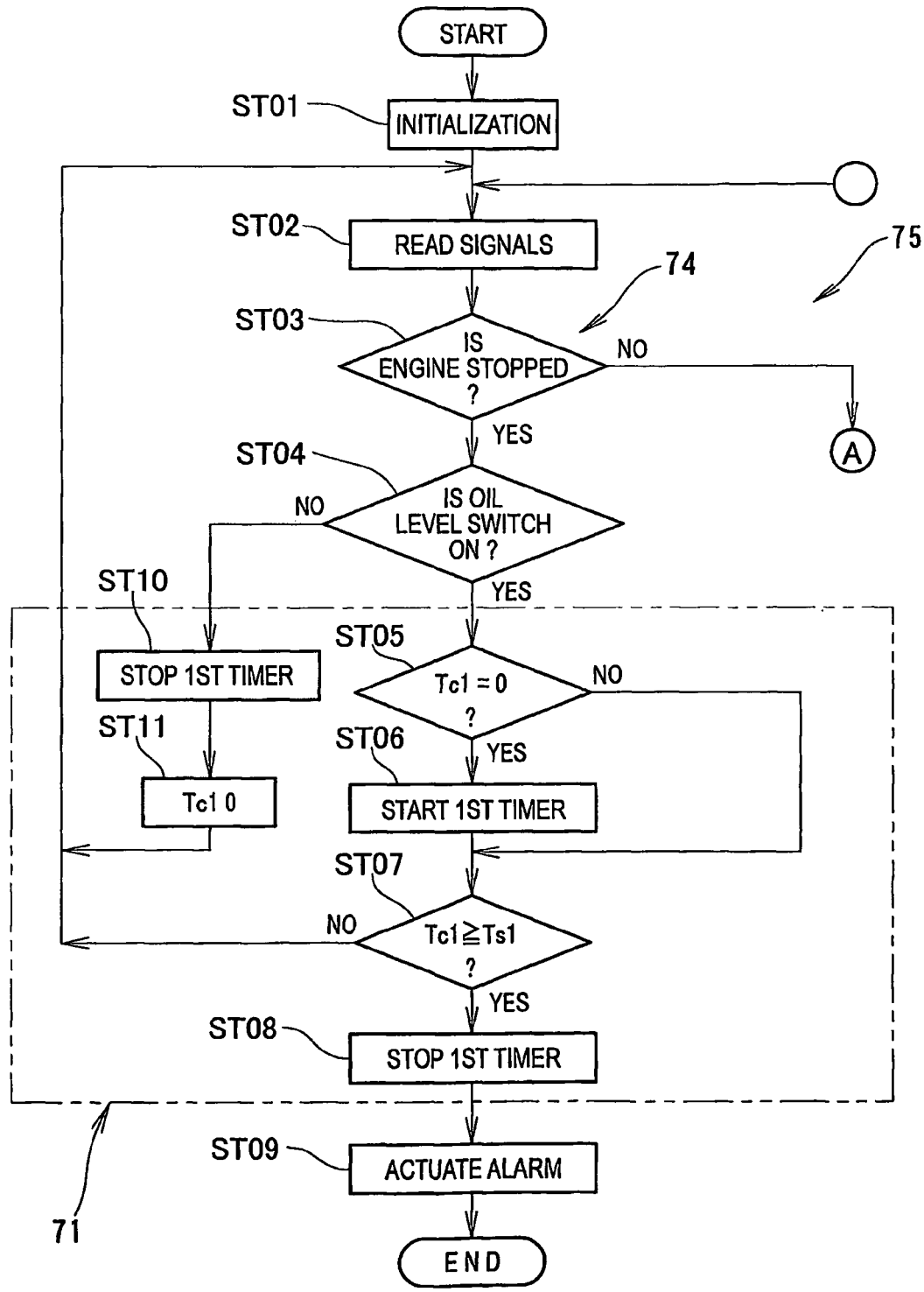
FIGS. 5 and 6 are control flowcharts of the controller shown in FIG. 4.

The first timer 71 shown in FIG. 5 is a combination of ST05 to ST08, ST10, and ST11. The counter 72 shown in FIG. 6 is a combination of ST22 and ST23. The second timer 73 shown in FIG. 6 is a combination of ST28 to ST31, ST33, and ST34. ST03 shown in FIG. 5 constitutes an engine operation determination unit 74 that determines whether the engine 10 is operating or stopped. The method for detecting the oil level using the oil level detection apparatus 60 for an engine is characterized in that the first and second determination criteria for determining the actual level drop of the oil Lu are established.

The first determination criterion is a criterion for determining that the actual level Lr of the oil Lu has dropped to the lower limit level L12 when two conditions have been satisfied, i.e., the condition that the engine 10 is stopped (ST03), and the condition that the duration Tc1 of the level drop signal has reached a preset reference time Ts1 (ST04 and ST07).

The second determination criterion is a criterion for determining that the actual level Lr of the oil Lu has dropped to the lower limit level L12 when two conditions have been satisfied, i.e., the condition that the engine 10 is operating (ST03), and the condition that the number of times Cu the level drop signal has been received has reached a preset reference number of times Cs (ST21 to ST23).

The oil level detection apparatus 60 for an engine is provided with a first determination unit 75 for determining the actual level drop of the oil Lu on the basis of the first determination criterion (see FIG. 5), and a second determination unit 76 for determining the actual level drop of the oil LU on the basis of the second determination criterion (see FIG. 6).

The first determination unit 75 is a combination of ST03, ST04, and the first timer 71 (particularly ST07) shown in FIG. 5. In other words, the first determination unit 75 is configured so as to determine that the actual level Lr of the oil Lu has dropped to the lower limit level L12 when two conditions have been satisfied, i.e., the condition that the engine 10 is stopped, and the condition that the duration Tc1 of the level drop signal has reached a preset reference time Ts1.

The second determination unit 76 is a combination of ST03, ST21, the counter 72, and the second timer 73 shown in FIGS. 5 and 6. In other words, the second determination unit 76 is configured so as to determine that the actual level Lr of the oil Lu has dropped to the lower limit level L12 when two conditions have been satisfied, i.e., the condition that the engine 10 is operating, and the condition that the number of times Cu the level drop signal has been received has reached a preset reference number of times Cs.

The second determination unit 76 is a combination of the second timer 73 and ST32 shown in FIG. 6, and is provided with a reset unit 77. The reset unit 77 is configured so as to reset to 0 the number of times Cu that the level drop signal has been received when the condition has been satisfied in which the next level drop signal has not been received in the interval of time that begins when the previous level drop signal is received and ends when a preset period of time Ts2 (second reference time Ts2) has elapsed. The terms "previous" and "next" level drop signals reflect the relative order of the level drop signals that are intermittently received.

More specifically, the reset unit 77 resets the number of times Cu that the level drop signal has been received when the interval of time Tc2 during which the level drop signal is received has reached a preset reference interval of time Ts2 (second reference time Ts2).

The combined structure of the changeover switch 64 shown in FIG. 4 and ST24 shown in FIG. 6 forms a mode switching unit 78 that switches between the subsequently described first mode and second mode.

The first mode is a control mode for actuating the alarm 63 (ST25) and stopping the engine 10 (ST26) in accordance with the determination of the second determination unit 76, when the unit has detected an actual drop in the level of the oil Lu (ST03 and ST23).

The second mode is a control mode for actuating the alarm 63 and continuing the actuated state (operating state) of the engine 10, i.e., a mode that only actuates the alarm 63 (ST27) in accordance with the determination of the second determination unit 76, when the unit has detected an actual drop in the level of the oil Lu (ST03 and ST23).

The effects of the oil level detection apparatus 60 for an engine are described next in accordance with the control flow of FIGS. 5 and 6 described above. The effects are described based on FIGS. 7 and 8 with reference to FIGS. 2A, 2B, and 4.

Figure 7:
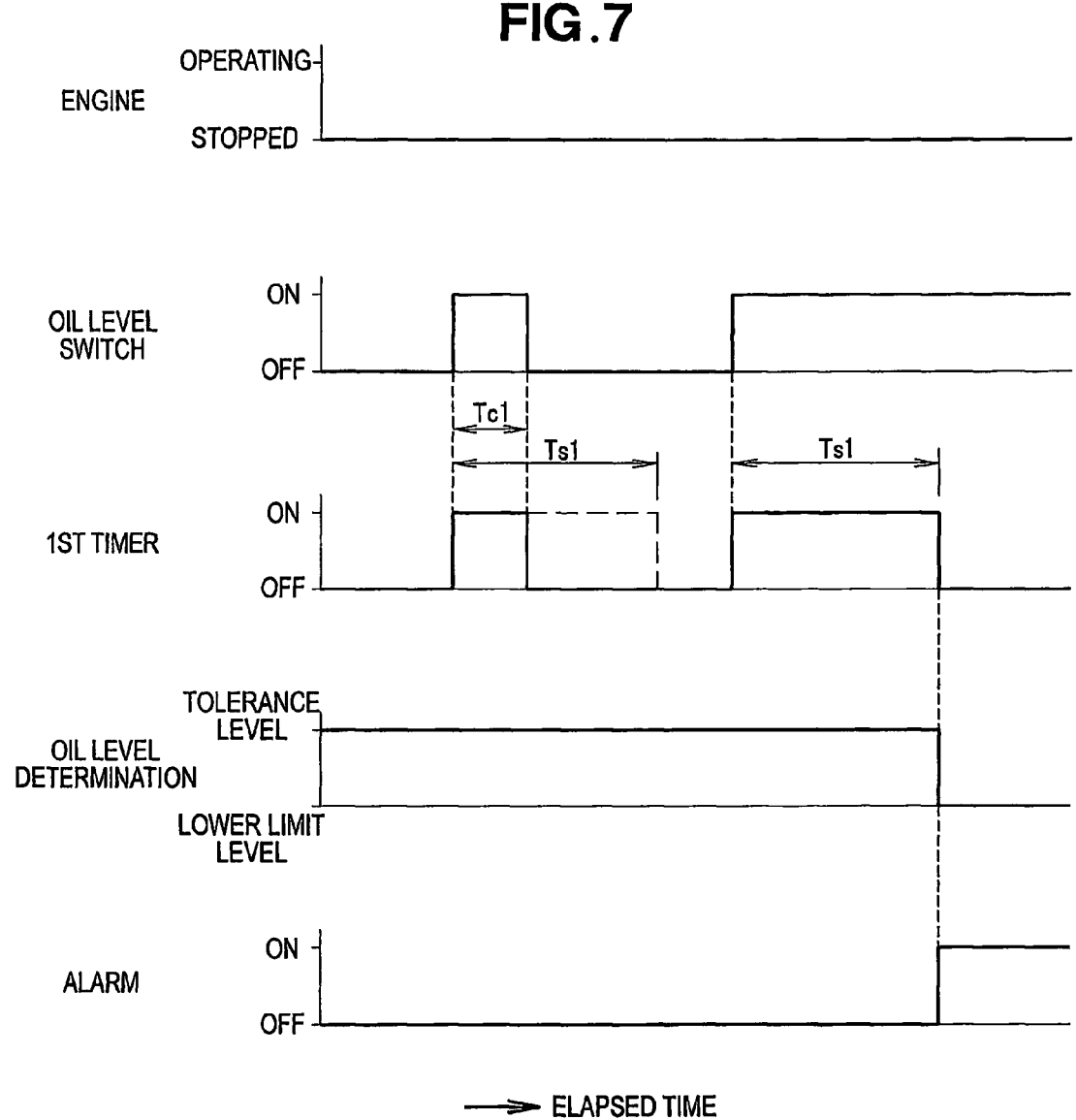
FIG. 7 is a diagram showing the effects of the oil level detection apparatus for an engine shown in FIG. 4, and is timing chart when the engine is stopped.

FIG. 7 is a timing chart in which the horizontal axis indicates the elapsed time. The drawing shows the operation of the oil level detection apparatus 60 of a stopped engine.

In the case that the engine is stopped, the oil level determination is the tolerance level (the level at which the lower limit level L12 has been exceeded) of a condition in which the oil level switch 58 is off. The alarm 63 is therefore off (stopped).

When the oil level switch 58 is thereafter switched on, the first timer 71 is switched on, and the timer count begins. When the duration Tc1 (count time Tc1) of the on-state of the oil level switch 58 has not reached a preset reference time Ts1, the oil level determination remains at the tolerance level.

When the duration Tc1 of the on-state of the oil level switch 58 has reached the reference time Ts1, the oil level determination reverts to the lower limit level L12. The alarm 63 is therefore switched on (actuated) and notification is provided that the actual level Lr of the oil Lu shown in FIG. 2B has dropped to the lower limit level L12. The OFF state of the engine 10 is maintained.

Figure 8:
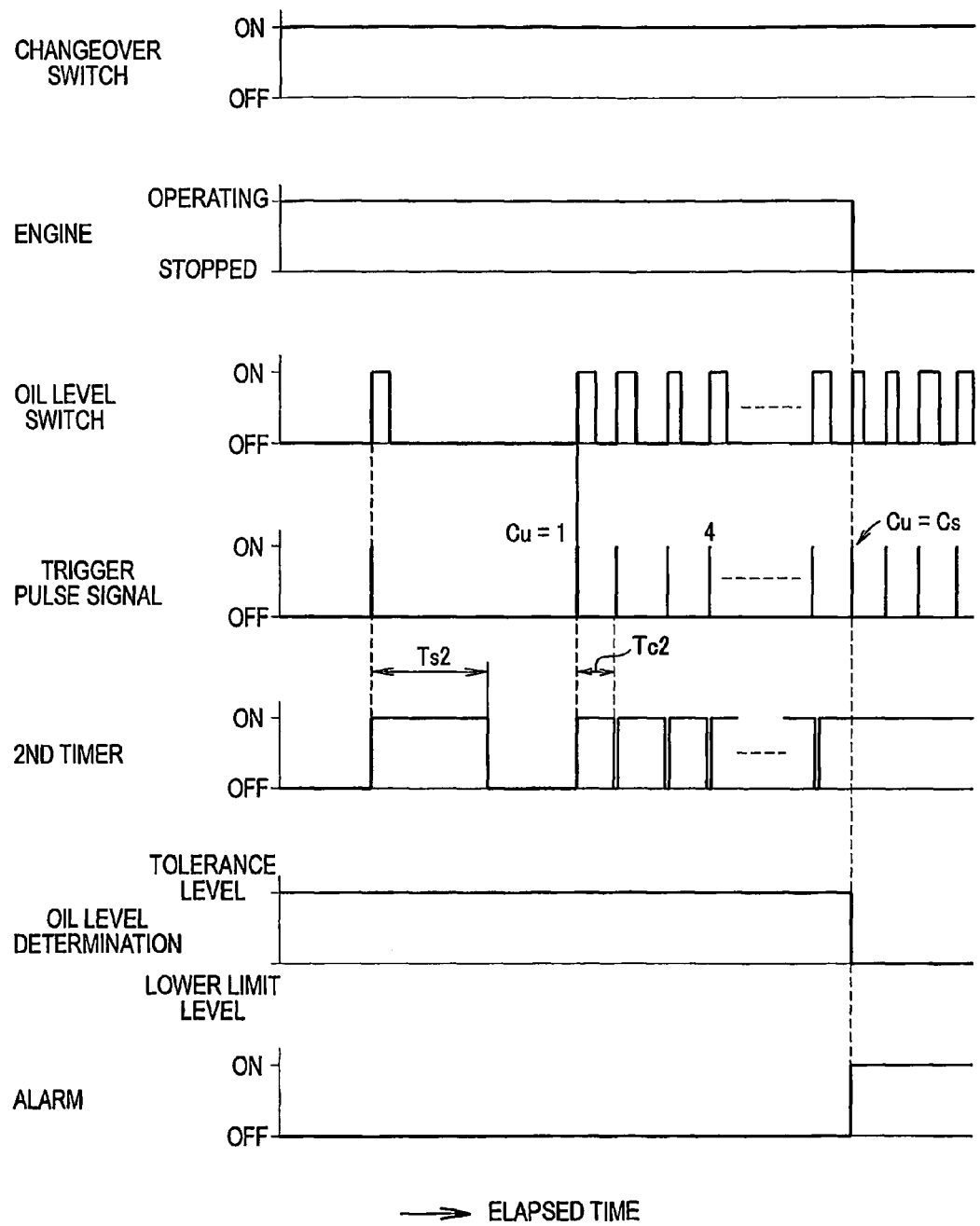
FIG. 8 is a diagram showing the effects of the oil level detection apparatus for an engine shown in FIG. 4, and is a timing chart of an operating engine.

FIG. 8 is a timing chart in which the horizontal axis indicates the elapsed time. The drawing shows the operation of the oil level detection apparatus 60 of an operating engine.

The changeover switch 64 is on and the engine 10 is operating. In this state, since the surface of the oil Lu is shaken by the vibrations of the engine, the oil level switch 58 cycles ON and OFF. The trigger pulse generator 66 issues a trigger pulse signal that has a very narrow pulse width, and the signal is issued only when the oil level switch 58 is on.

After the oil level switch 58 has been switched on a single time, the oil level determination is left at the tolerance level when the oil level switch 58 is not switched on again by the time the second reference time Ts2 set by the second timer 73 has elapsed. More specifically, in the case that the next level drop signal is not received by the time the second reference time Ts2 has elapsed after the previous level drop signal is received, the oil level determination is left unchanged at the tolerance level. For this reason, the alarm 63 is switched off (stopped) and the engine 10 is kept in an operating state.

On the other hand, the number Cu of ON operations are counted in cases in which the oil level switch 58 repeatedly switches on and off in a time period Tc2 that is shorter than the second reference time Ts2. When the number of times Cu reaches a preset reference number of times Cs, the oil level determination is reverted to the lower limit level L12. For this reason, the alarm 63 is switched on (actuated), and notification is provided that the actual level Lr of the oil Lu has dropped to the lower limit level L12, as shown in FIG. 2B. Additionally, the engine 10 is stopped.

Following is a summary of the oil level detection method and the effects of the oil level detection apparatus 60 for an engine.

Since the state of the surface of the oil Lu differs when the engine 10 is stopped and operating, the behavior of the float 54 also differs in a corresponding manner, as shown in FIGS. 1, 2A, and 2B.

In other words, the surface of the oil does not vary when the engine 10 is stopped, and the surface of oil experiences considerable vertical movement when the engine 10 is operating.

In contrast, the oil level detection apparatus 60 for an engine according to the present invention is provided with two determination units for determining an actual drop in the level of the oil Lu, i.e., the first determination unit 75 and second determination unit 76 (see FIGS. 5 and 6).

The first determination unit 75 determines an actual level drop when the engine 10 is stopped and the level drop signal (state in which the movable contact 55 is in contact with the fixed contacts 56 and 56) has continued over a fixed period to time Ts1. The first determination unit 75 is optimal for determining an actual level drop when the engine 10 is stopped.

On the other hand, the second determination unit 76 determines that the actual level has dropped when the engine 10 is operating and the level drop signal has been received a fixed number of times Cs (Cu≧Cs). The second determination unit is optimal for determining an actual level drop when the engine 10 is operating.

In other words, the oil level detection method for an engine is characterized in that two determination criteria are established for determining an actual drop in the level of the oil Lu, i.e., a first determination criterion and a second determination criterion. The first determination criterion is used to determine that the actual level has dropped when the engine has stopped and the level drop signal continues over a fixed length of time Ts1. The second determination criterion is used to determine that the actual level has dropped when the engine 10 is operating and the level drop signal has been received a fixed number of times Cs (Cu≧Cs).

Furthermore, the second determination unit 76 is provided with a reset unit 77, as shown in FIG. 6. Therefore, when the interval of time Tc2 in which the level drop signal is received is considerable, the second determination unit 76 determines that the level drop signal is not (e.g., temporary noise) a detection signal that accompanies the ordinary vertical movement of the oil surface when the level is detected during the operation of the engine 10, and the number of times Cu that the level drop signal has been received can be reset.

A mode switching unit 78 is furthermore provided to the oil level detection apparatus 60 for an engine. Therefore, the mode switching unit 78 can be used to switch between a first mode for actuating the alarm 63 and stopping the engine 10 in accordance with the level drop signal, and a second mode for actuating the alarm 63 and continuing to operate the engine 10 in accordance with the level drop signal. In other words, a single type of oil level detection apparatus 60 for an engine can be used to switch the mode with the aid of the mode switching unit 78 between automatically stopping or not stopping the engine 10 when the level of the oil Lu in the crankcase 11 has dropped to a fixed level or lower.

A portion of the mode switching unit 78 is furthermore configured with a changeover switch 64 that is composed of a manual operating switch, and the changeover switch 64 is mounted on the operating panel 61 of the engine 10. In other words, the mode switching unit 78 is composed of a manual operating changeover switch 64.

A modified example of the mode switching unit 78 is described next on the basis of FIGS. 9 and 10. The engine 10 and the oil level detection apparatus 60 have the same configuration as those shown in FIGS. 1 to 8 described above, and the same reference numerals are assigned thereto. A description thereof is omitted.

Figure 10:
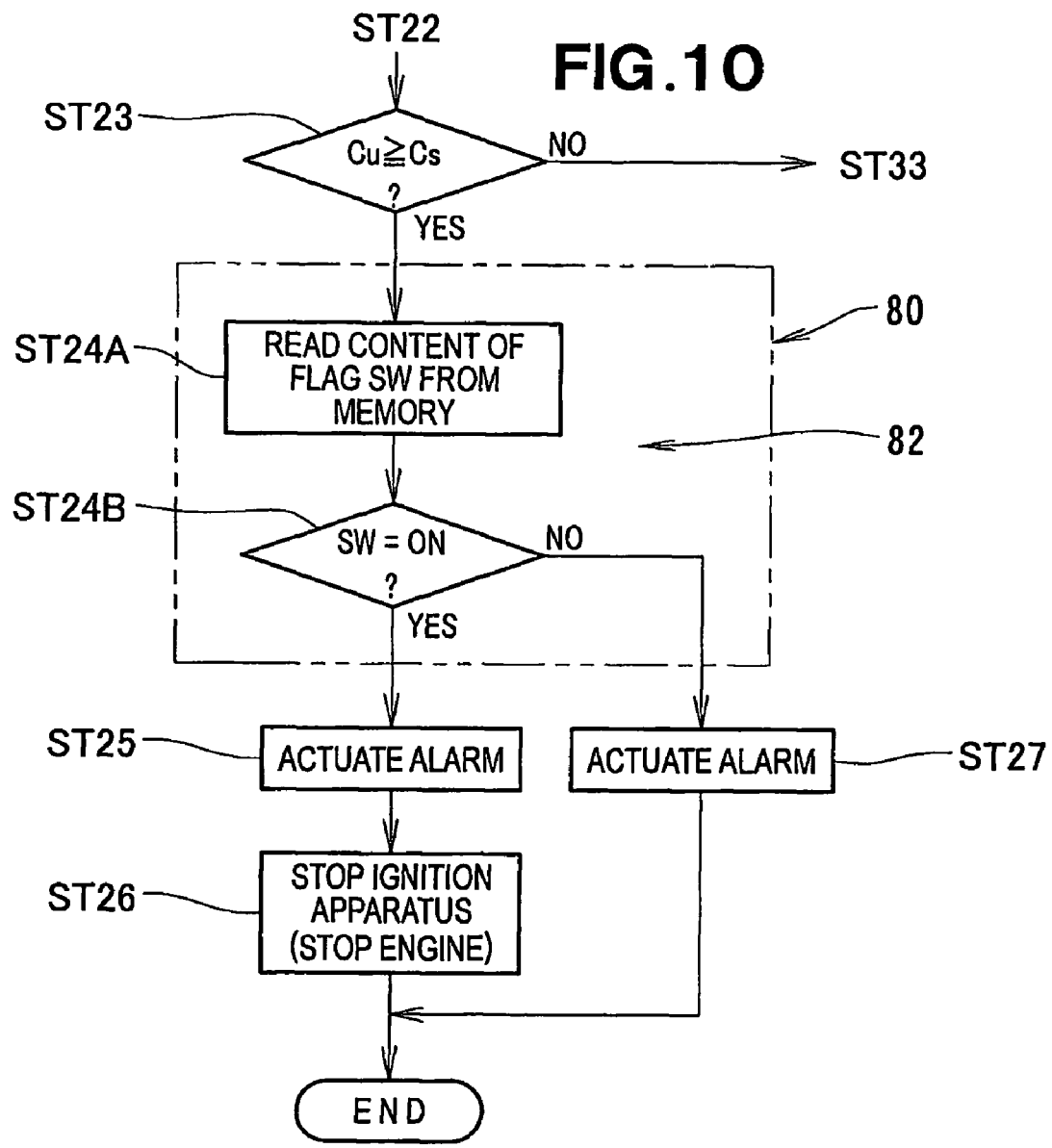
FIG. 10 is a control flowchart in the controller provided with the mode switching unit of a modified example of the present invention.
Figure 11A:
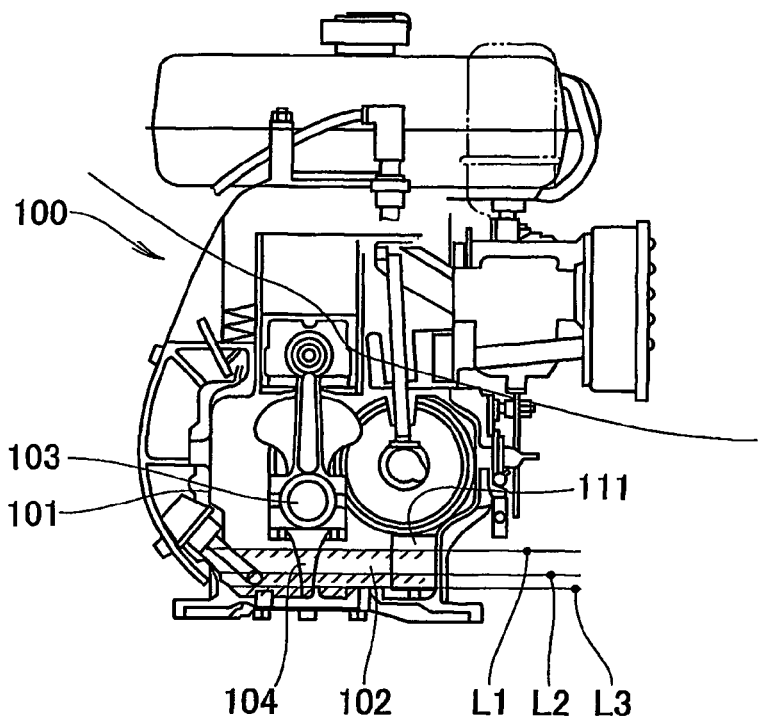
FIGS. 11A and 11B are schematic diagrams of an engine provided with a convention engine oil level detection apparatus.
Figure 11B:
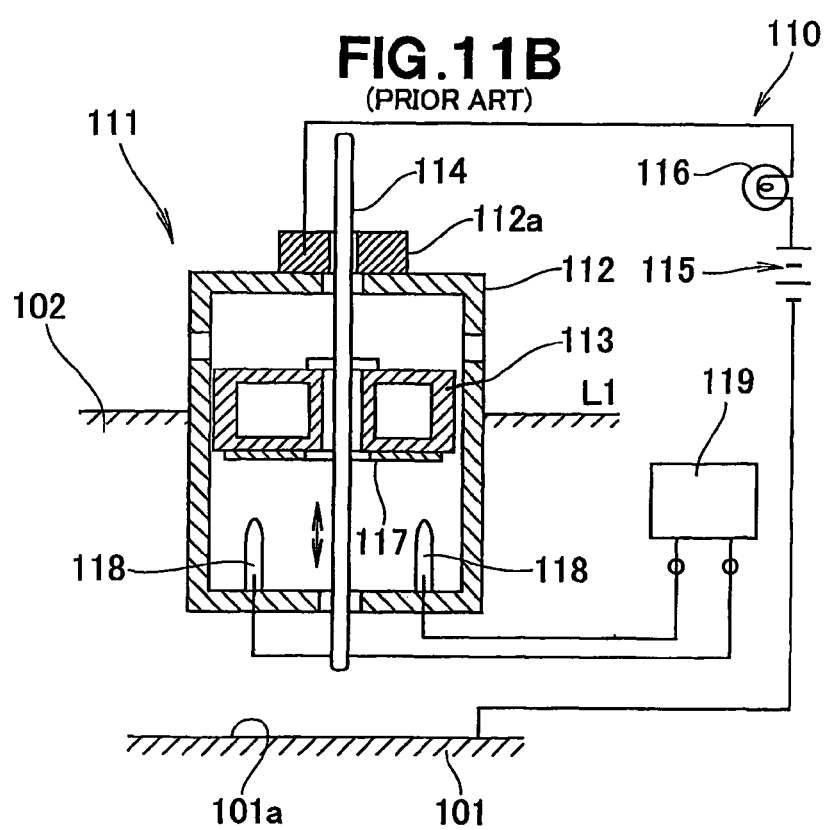

In the control flow shown in FIG. 10, ST24A and ST24B of the modified example are used in place of ST24 of FIG. 6 described above.

Figure 9:
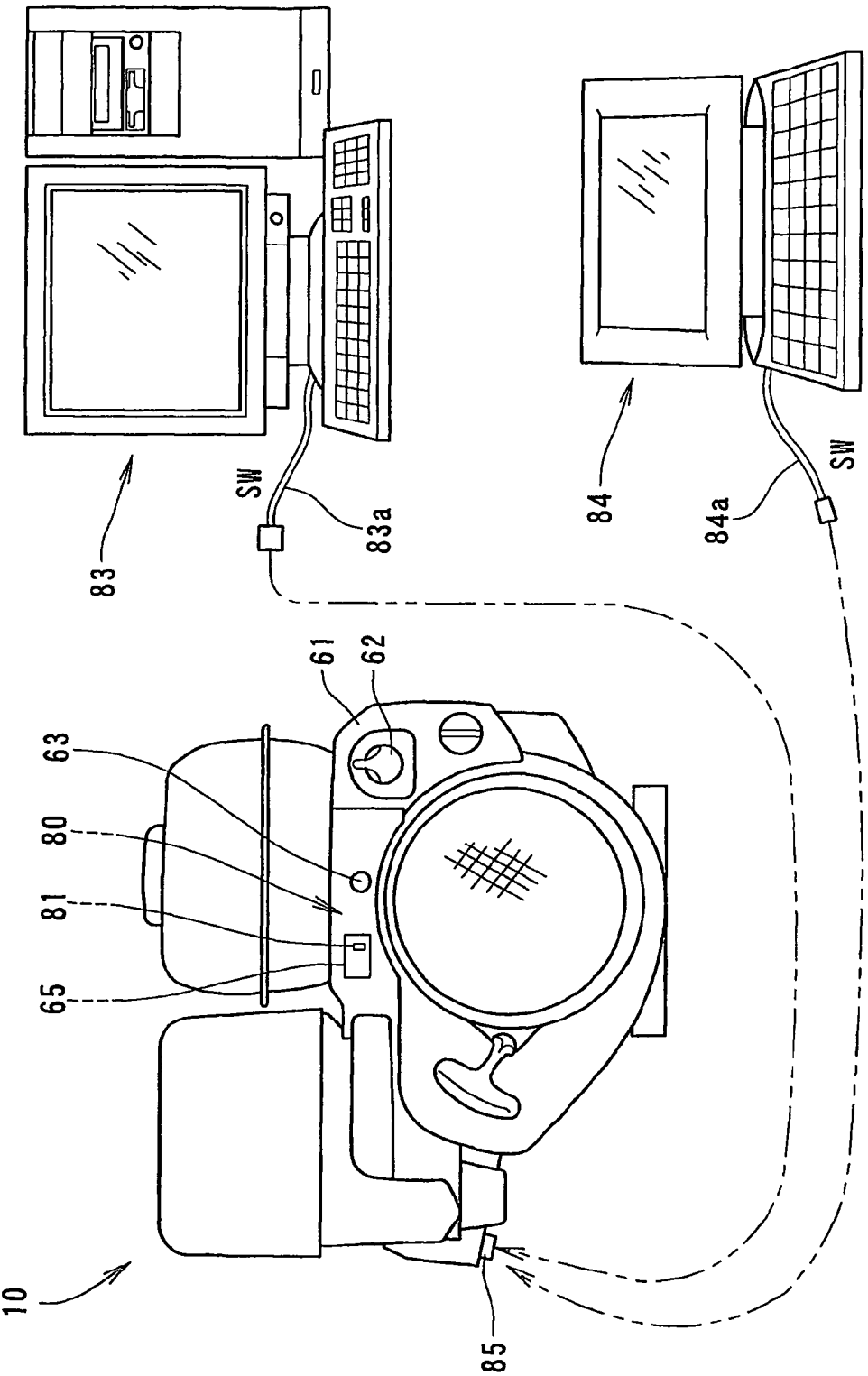
FIG. 9 is a conceptual view of the communication unit and the engine provided with the mode switching unit of a modified example of the present invention.

The modified example of the mode switching unit 80 is composed of a memory 81 and a switching actuator 82 (see FIG. 10) designed for the engine 10, as shown in FIG. 9. The memory 81 is a storage unit to which mode switching data SW can be written in accordance with communication from an external communication unit, i.e., a first communication unit 83 and a second communication unit 84. The memory may, for example, be composed of a RAM (random access memory). More specifically, the controller 65 houses the memory 81. The switching actuator 82 switches to one of two modes, i.e., a first mode and a second mode, on the basis of the mode switching data SW stored in the memory 81.

The first communication unit 83 is an inspection/management device that is used in the complete inspection or factory shipping step after the engine 10 or the work machine provided with the engine 10 have been manufactured. The unit is composed of a computer referred to as a desktop computer, for example.

The second communication unit 84 is a sales management device that can be used on a commercial scale with the market for the work machine provided with the engine 10. The unit is composed of a computer referred to as a notebook computer, for example.

The following procedure can be used to write mode switching data SW into the memory 81 by using the communication units 83 and 84.

First, a cord 83a of the first communication unit 83 or a cord 84a of the second communication unit 84 is inserted and connected to the terminal 85 of the engine 10.

Next, the communication unit (first communication unit 83 or second communication unit 84) connected to the terminal 85 is operated and mode switching data SW is transmitted to the memory 81 via the controller 65 by using a prescribed communication mode. As a result, mode switching data SW can be written and stored in the memory 81.

As used herein, the term "mode switching data SW" is, for example, a flag that is used in the control flow of FIG. 10. For the sake of convenience, the mode switching data SW is referred to below as "flag SW." If the flag SW is on, the first mode has been selected, and if the flag SW is off, the second mode has been selected.

The switching actuator 82 is a combination of steps ST24A and ST24B, as shown in FIG. 10. The control flow of the controller 65 is described based on FIG. 10.

ST23: It is determined whether the pulse count Cu has reached a preset reference pulse count Cs. If YES, the process goes to ST24A. If NO, the process goes to ST33 (see FIG. 6).

ST24A: The content of the flag SW (mode switching data SW) is read from the memory 81.

ST24B: It is determined whether the flag SW is on. If YES, it is determined that the first mode is selected, and the process goes to ST25. If NO, it is determined that the second mode is selected, and the process goes to ST27.

ST25: Alarm 63 is actuated.

ST26: The ignition apparatus 67 is stopped, and control by the controller 65 is ended.

ST27: Alarm 63 is actuated, and control by the controller 65 is ended.

In accordance with the modified example as described above, the switching actuator 82 can automatically switch to the first mode or second mode with the aid of the external communication units 83 and 84 on the basis of the mode switching data SW by writing the mode switching data SW to the memory 81 provided to the engine 10. For this reason, the user is not required to switch between the first mode and second mode.

In the present invention, ST21 shown in FIG. 6 can be configured to determine whether the oil level switch 58 has been reverted from OFF to ON. The trigger pulse generator 66 is therefore not necessarily required.

It can be determined in step ST21 that the switch signal has been reverted from OFF to ON by executing an interrupt routine in the controller 65 each time the switch signal issued from the oil level switch 58 to the controller 65 is reverted from an OFF signal to an ON signal.

The mode switching unit 78 is not limited to a configuration in which the changeover switch 64 is manually switched, and a configuration may also be used in which switching is carried out automatically in accordance with the nature of the work of the engine 10, for example.

The mode switching unit 78 may or may not be present. In the case that the mode switching unit 78 is dispensed with, a configuration can be used in which a YES in the determination in step ST23 triggers (1) steps ST25 and ST26 so that the alarm 63 is actuated and the engine 10 is stopped, or (2) step ST27 so that the alarm 63 is actuated and the engine 10 is allowed to continue operation unchanged.

The steps ST25 and ST26 may be configured to execute at least one of the two options. In the case that ST25 is dispensed with, the engine 10 is merely stopped in ST26. In the case that ST26 is dispensed with, the alarm 63 is merely actuated in ST25.

The determination as to whether the engine 10 is stopped can be made depending on the characteristics of the implement in which the engine 10 is mounted, such as the characteristics of work machines.

Following are possible configurations for providing notification from the alarm 63 that the actual level Lr of the oil Lu has dropped to the lower limit level L12.

(i) An alarm 63 composed of a display lamp is lighted.

(ii) An alarm 63 composed of a display lamp is ordinarily kept constantly lighted to notify that the engine 10 is in a normal state, and the lamp is made to blink or light a different display color when the actual level Lr has dropped to the lower limit level L12.

(iii) An alarm 63 composed of a buzzer, voice generator, or another warning sound device emits a warning sound or a warning message.

INDUSTRIAL APPLICABILITY

In the present invention, a single type of oil level detection apparatus 60 for an engine is used to select one of two modes with the aid of mode switching units 78 and 80 and to automatically stop or not stop the engine 10 when the level Lr of the oil Lu in the crankcase 11 has dropped to a fixed level or lower. Therefore, the present invention can be used in an engine 10 mounted in any type of implement (e.g., machines capable of performing various tasks, or the like).

The oil level detection apparatus 60 according to the present invention can accurately and reliably detect the level of the oil Lu pooled in the crankcase 11 when the engine 10 is operating or stopped. Therefore, the present invention can be adopted in all types of engines 10, and can be used for detecting the level of oil Lu of an automobile engine and general-purpose engines that are mounted in agricultural and work machines in particular, and in other types of machines.

The invention claimed is:

1. An oil level detection apparatus used in an engine in which an oil dipper lifts oil in a crankcase and performs lubrication in accompaniment with rotation of a crankshaft, said apparatus comprising:

an oil level detector emitting a level drop signal indicating that the oil level has dropped when a movable contact, disposed on a float that moves vertically in accordance with a level of said oil, makes contact with fixed contacts once the level of said oil has dropped to a preset lower limit level; and a mode switching unit selecting one of two modes, selected from a first mode for actuating an alarm in accordance with said level drop signal and bringing said engine to a stop, and a second mode for actuating said alarm in accordance with said level drop signal and allowing the engine to continue to operate.

2. The oil level detection apparatus of claim 1, characterized in that said mode switching unit comprises a manual operating switch that can be mounted on an operating panel of said engine.

3. The oil level detection apparatus of claim 1, characterized in that:
   said mode switching unit comprises a switching actuator and a memory provided to said engine;
   said memory is configured so that mode switching data can be written in accordance with communication from an external communication unit; and
   said switching actuator can be switched between one of two modes selected from said first mode and said second mode on the basis of said mode switching data stored in said memory.

4. The oil level detection apparatus of claim 1, further comprising a first determination unit and a second determination unit for determining that the level of said oil has actually dropped, wherein
   said first determination unit determines that the level of said oil has actually dropped to said lower limit level when said engine is stopped and a duration of said level drop signal has reached a preset reference time, and said second determination unit determines that the level of said oil has actually dropped to said lower limit level when said engine is operating and a number of times said level drop signal has been received has reached a preset reference number of times.

5. The oil level detection apparatus of claim 4, wherein said second determination unit is provided with a reset unit for resetting the number of times said level drop signal has been received when a next one of said level drop signal has not been received before a preset fixed time has elapsed after having received a previous said level drop signal.

6. A method for detecting a level of oil in the crankcase of an engine, the method comprising the steps of:
   detecting the level of said oil by using an oil level detector having a float, a movable contact, and fixed contacts;
   issuing a level drop signal by said oil level detector when the level of said oil has dropped to a preset lower limit level;
   determining that the level of said oil has actually dropped to said lower limit level when said engine is stopped and a duration of said level drop signal has reached a preset reference time; and
   determining that the level of said oil has actually dropped to said lower limit level when said engine is operating and a number of times said level drop signal has been received has reached a preset reference number of times.

* * * * *